United States Patent [19]

McCauley

[11] Patent Number: 6,058,351
[45] Date of Patent: May 2, 2000

[54] MANAGEMENT ZONES FOR PRECISION FARMING

[75] Inventor: James D. McCauley, Westmont, Ill.

[73] Assignee: Case Corporation, Racine, Wis.

[21] Appl. No.: 09/151,125

[22] Filed: Sep. 10, 1998

[51] Int. Cl.⁷ .................................................... G06F 19/00
[52] U.S. Cl. ......................................................... 702/5
[58] Field of Search ........................... 702/2, 5; 706/925, 706/930, 931, 929

[56] References Cited

U.S. PATENT DOCUMENTS

| | | | |
|---|---|---|---|
| 5,119,438 | 6/1992 | Ueda et al. ................................ | 382/14 |
| 5,373,486 | 12/1994 | Dowla et al. ............................ | 367/135 |
| 5,729,662 | 3/1998 | Rozmus ..................................... | 395/23 |
| 5,749,367 | 5/1998 | Gamyln et al. ......................... | 128/696 |

OTHER PUBLICATIONS

Wasserman, Philip D., *Neural Computing: Theory and Practice*; "Counterpropagation Networks", pp. 61–75, 1989.
Hecht–Nielsen, Robert, *Neurocomputing*; "Competitive Learning", pp. 63–70, 1989.

*Primary Examiner*—Donald E. McElheny, Jr.
*Attorney, Agent, or Firm*—Foley & Lardner

[57] ABSTRACT

A method and apparatus for determining management zones in a field for precision farming. The method and apparatus use a self-organizing network, such as a Kohonen neural network, to perform the classification of site-specific farming data into management zones in a farm field. The self-organizing network is configured to learn the proper classifications through a learning or training process.

34 Claims, 4 Drawing Sheets

MANAGEMENT ZONES FOR PRECISION FARMING

FIELD OF THE INVENTION

The present invention relates to the analysis of site-specific farming data. In particular, the present invention relates to a neural network system used to classify site-specific farming data, thereby providing a map of a farm field with areas classified into a plurality of management zones.

BACKGROUND OF THE INVENTION

Research within the agricultural community has shown that management of crop production may be optimized by taking into account spatial variations that often exist within a given farming field. For example, by varying the farming inputs supplied to a field according to local conditions within the field, a farmer can optimize crop yield as a function of the inputs being applied while preventing or minimizing environmental damage. This management technique has become known as precision, site-specific, prescription or spatially-variable farming. Management of a field using precision farming techniques requires a farmer to gather information or data relating to various characteristics or parameters of the field on a site-specific basis. Data may be obtained in a number of ways including taking manual measurements, remote sensing or by sensing during field operations. A farmer may take manual measurements by visually noting characteristics of a field (e.g., insect infestation) and recording the position as he traverses the field, or by taking soil samples, recording the position, and analyzing them in a laboratory. Remote sensing may include taking aerial photographs of a field, or generating spectral images of the field from airborne or space borne multi-spectral sensors.

Spatially variable characteristic data may also be acquired during field operations using appropriate sensors supported by a combine, tractor, or other agricultural vehicle. Spatially-variable data may relate to local conditions of the field, farming inputs supplied to the field, or crops harvested from the field. The data may represent soil properties (e.g., soil type, soil fertility, moisture content, compaction or pH), crop properties (e.g., height, moisture content, or yield), or farming inputs supplied to the field (e.g., fertilizers, herbicides, water, insecticides, seeds, cultural practices or tillage techniques used). Other site-specific data may represent insect or weed infestation, land marks, or topography (e.g., altitude).

Once spatially-variable farming data are obtained, it would be desirable to classify the site-specific data at each position in a field into a finite, and preferably convenient, number of discrete management zones. For example, it may be desirable to take measurements of yield, fertilizer applied, and soil moisture at a plurality of positions throughout the field. It would then be desirable to classify the measurements into a limited number of management zones while noting the position or boundaries of these zones. Each zone would represent a region or regions in the field in which the site-specific data is most closely related with other site-specific data in that field based on some definable measure. By this analysis, a management zone map of the field or fields would be created. A management zone map may be used to make general judgments about the field, or to generate prescription maps based upon the analysis results. Such a prescription map may then be used to generate command signals for variable rate controllers adapted to apply farming inputs to the field in amounts that vary as a function of the management zone at the positions in the field. Variable-rate controllers may be mounted on tractors, spreaders, or planters equipped with variable-rate applicators, and may be used to control the application rates for seeds, fertilizers, herbicides, and other farming inputs. By optimizing application rates based upon management zone information, the amounts of various farming inputs applied to the field can be optimized.

Classifying site-specific farming data, however, can be a complex task involving categorizing possibly a large number of measurements, each measurement having a continuous spectrum of possible values, at each position in the field, thereby leading to an infinite number of possible combinations of measurements at any discrete position. Therefore, it is desirable to have an automated system for classifying site-specific farming data, at each position in the field, into a finite number of management zones. Each position classified as belonging within a single management zone will have similar characteristics to every other position classified as belonging within that management zone.

Current systems do not provide easy to use tools for classifying site-specific farming data into a discrete number of management zones. The inability to organize site-specific farming data in such a manner may prevent the discovery of relationships and interactions between different characteristics that occur within fields. The inability to discover relationships may result in farming inputs being applied in a less than optimal manner, resulting in reduced crop yield or excess environmental damage. The inability to quantitatively organize the effects of farming inputs on yield may prevent the performance of an informed cost-benefit analysis to determine an optimum approach to take. Additionally, the inability to classify site-specific farming data in management zones may discourage a farmer from "experimenting" by applying certain farming inputs in determining the effect on field characteristics since the farmer may not be able to fully analyze the results. These problems are not solved by existing systems since they do not provide easy to use tools for classifying site-specific farming data. Further, existing systems may also include data tables or may perform calculations which do not accurately reflect commonalties that exist between characteristics of a particular field being farmed.

SUMMARY OF THE INVENTION

The present invention relates to a method of determining management zones in a field for precision farming. The method includes the steps of obtaining site-specific farming data, providing the site-specific farming data to a self-organizing network, obtaining classification outputs from the self-organizing network, and correlating the classification outputs of the self-organizing network with positions in the field. The self-organizing network classifies locations in the field into management zones based upon the site-specific farming data.

The present invention further relates to an apparatus for determining at least two management zones in a field, based upon field characteristics at a multiplicity of field positions. The apparatus includes an information input device for receiving site-specific field characteristic data, a self-organizing network coupled to the information input device, and an information output device coupled to the self-organizing network. The information output device communicates the management zone classifications. The self-organizing network classifies each of the field positions into one of the at least two management zones.

The present invention still further relates to a computing apparatus for determining at least two management zones in a field, based upon field characteristics at a multiplicity of field positions. The apparatus includes an input device, a microprocessor coupled to the input device, an output device coupled to the microprocessor, and a memory device coupled to the microprocessor. The memory device stores a Kohonen neural network program. The program is read and executed by the microprocessor to implement a Kohonen neural network. The Kohonen neural network receives field characteristic data from the input device, and communicates management zone data to the output device.

BRIEF DESCRIPTION OF THE DRAWINGS

The invention will become more fully understood from the following detailed description, taken in conjunction with the accompanying drawings, wherein like reference numbers refer to like parts, in which.

DETAILED DESCRIPTION OF THE PREFERRED EMBODIMENTS

Figure 1:
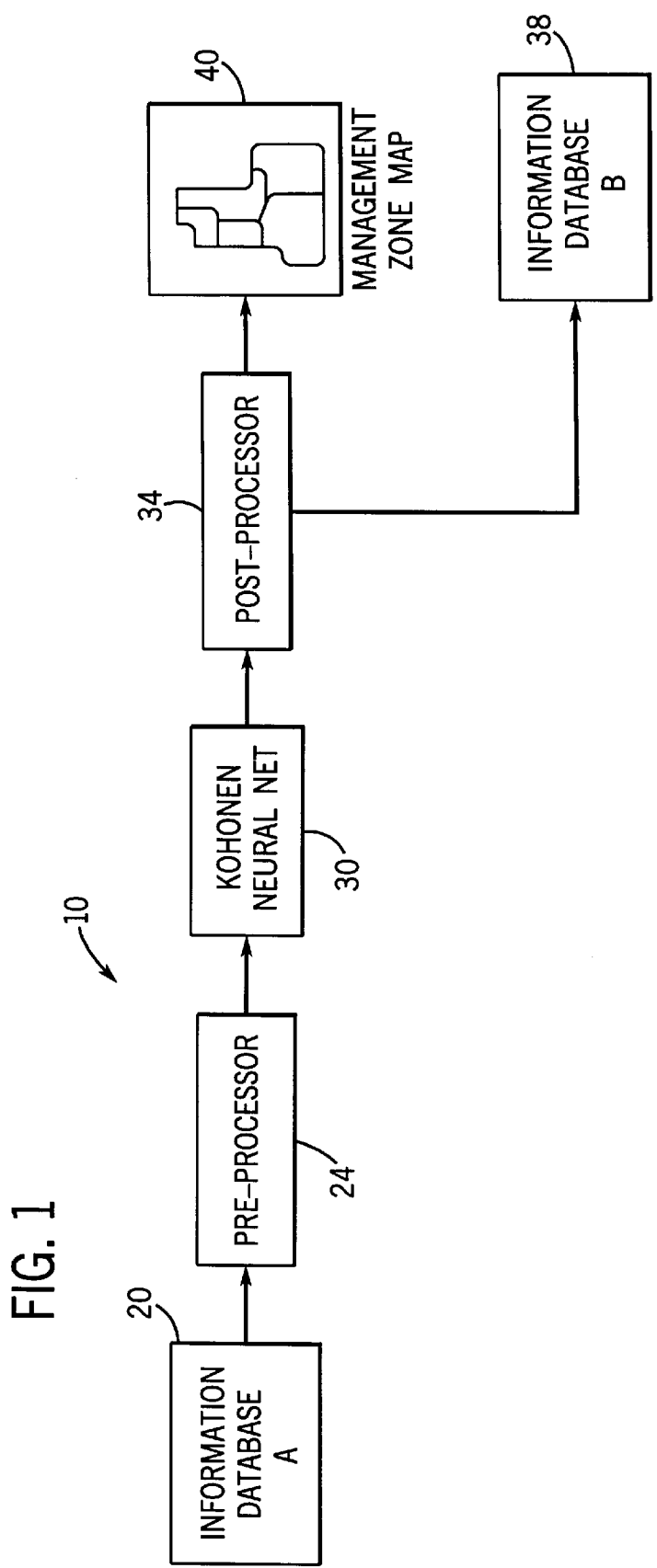
FIG. 1 is a block diagram representing a system for classifying site-specific farming data into management zones.

Various types of equipment may be used to gather site-specific data representing various characteristics of a farm field. For example, a field may be sampled at different locations while the field is traversed by an appropriately-equipped agricultural vehicle such as a combine, planter, spreader, or tractor or by a general purpose vehicle such as a four wheel drive truck. The farmer may also sample the field at different locations while traversing the field on foot. Also, site-specific characteristics may be gathered by remote sensing from an airborne vehicle such as an airplane or space borne platform such as a satellite. Each technique for gathering such data includes circuitry or sensors that determine a characteristic of the field at different locations and a location determining circuit which generates location signals representative of the field positions at which the samples were taken. Referring now to FIG. 1, site-specific farming data gathered in the above manner is stored in an information database 20 of a neural processing system 10.

Neural processing system 10 further includes a preprocessor 24, a Kohonen neural network system 30, a post processor 34, an information database 38, and an output map display 40. In operation, once data representing spatially-variable characteristics of a farming field are obtained, the data are communicated to neural processing system 10. The collected data are communicated to and stored in information database 20. The collected data in database 20 are communicated to preprocessor 24, preprocessor 24 serving multiple functions. The first function of preprocessor 24 is as an interface between the user and neural processing system 10. The second function of preprocessor 24 is as a data conditioner configured to mathematically transform data to be provided to Kohonen neural network 30.

The use of Kohonen neural network 30 involves a two stage process. The first stage is a training or learning process in which Kohonen neural network 30 "learns" the proper input/output mapping (or the proper classification scheme) through an iterative process. The second stage is the classification process in which site-specific farming data is provided to Kohonen neural network 30 and Kohonen neural network 30 provides the appropriate management zone classifications.

Figure 3:
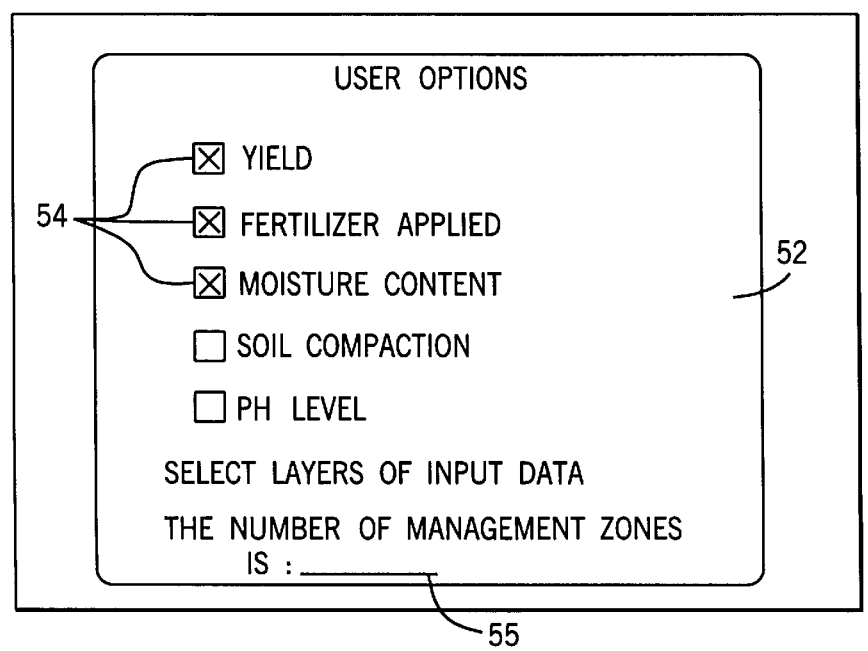
FIG. 3 depicts an example of a user interface display enabling a user to select the inputs to be used, and the number of management zones to which the site-specific farming data is to be classified.

Referring now to FIG. 3, a user interface 50 for neural processing system 10 includes a CRT display screen 52. Alternatively, user interface 50 may include an LCD display screen, a touch sensitive display screen, or a plurality of labeled lights with associated switches. An exemplary display such as screen 52 prompts the user to provide input to neural processing system 10. User interface 50 may include a number of check boxes 54, each corresponding to a particular field characteristic. For example, in FIG. 3, a user may select yield, fertilizer applied, moisture content, soil compaction, or pH level. However, the design is not limited to the particular field characteristics shown in FIG. 3, nor to the number of field characteristics shown. Check boxes 54 may be independently selected or deselected using any of a number of commonly known selection devices, such as, a cursor system controlled by a keyboard, a track ball, a joystick, a mouse, or a touch sensitive pad, or through use of a touch sensitive screen or a number of toggle switches. Further, other user interfaces may be used such as, for example, pull down menus. User interface 50 also allows a user to input the number of management zones to be used by providing a number at a prompt 55. A user may input the number of management zones desired through any of the aforementioned devices further including a pull down menu or a control knob.

Referring again to FIG. 1, preprocessor 24 may also perform a mathematical transformation of the input data from information database 20, to condition the site-specific farming data to be better utilized by neural processing system 10. The transformation applied may be any of a number of mathematical transformations such as a vector normalization. The transformation applied is not limited to standard vector normalization; the preprocessor may provide any of an infinite number of transformations which will provide improved performance of the input data from preprocessor 24 that is provided to Kohonen neural network 30. Kohonen neural network 30 classifies the input data into the number of discrete management zones that was input by the user at prompt 55 (shown in FIG. 3).

Figure 4:
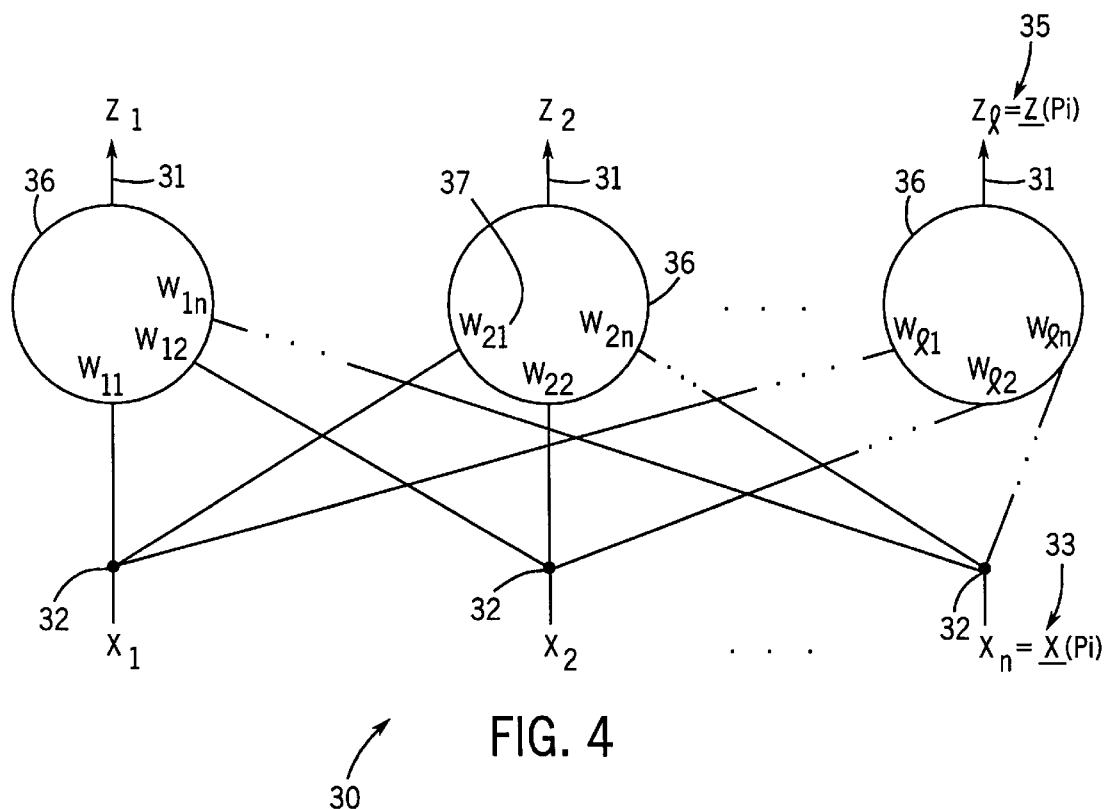
FIG. 4 is a schematic block diagram representing a Kohonen neural network.

Referring now to FIG. 4, Kohonen neural network 30 includes n inputs 32, the number n corresponding to the number of check boxes 54 selected on user interface 50. Each input receives a single site-specific characteristic value. For example, $X_1$ may represent the yield characteristic, $X_2$ may represent fertilizer applied, and $X_n$ may represent the moisture content. This input data may be referred to as a vector X 33 at a specific position $P_i$. Therefore, X ($P_i$) represents the field characteristic data at position $P_i$ of the field. Kohonen neural network 30 also includes a multiplicity of processing units 36 and a multiplicity of outputs 31, as depicted in FIG. 4. The number of processing units 36 is equal to the number of outputs 31. The number of outputs is designated by the subscript l and the output vector is denoted as vector Z (P$_i$) 35. Each output represents a single management zone correlated to position P$_i$ in the farm field. Processing units 36, sometimes referred to as neurons or nodes, have associated with them a set of weights or weighted interconnections 37 denoted as W$_{kj}$ where K=1, . . . , l and j=1, . . . , n.

In operation, input vector X (P$_i$) 33 is supplied to inputs 32 by an analog or digital signal. Inputs 32 double as fan out units, each fan out unit communicating the respective input signal to each and every processing unit 36. Weights 37, associated with each input to processing units 36, act as amplifiers, gains, or multipliers, thereby multiplying the signal provided from inputs 32 by the related weight value. For example, the signal provided by input X$_1$ to the second processing unit will be multiplied by weight W$_{21}$.

Similarly, the signal provided by input X$_n$ to the first processing unit will be multiplied by weight W$_{1n}$. Therefore, the l elements of output vector Z (P$_i$) 35 for a position P$_i$ is computed according to the equation:

$$Z_j = \sum_{k=1}^{n} X_k W_{jk}$$
$$j = 1, \ldots, l.$$

The management zone associated with position P$_i$ based upon site specific characteristics at position P$_i$, X (P$_i$) 33, can be obtained by finding the maximum element of output vector Z (P$_i$) 35. For example, if the maximum element of output vector Z (P$_i$) 35 is element Z$_3$, then position P$_i$ will be classified in management zone 3. The above equation is just one of a plurality of mathematical transfer functions that processing elements 36 are configured to use. Alternatively, distance metrics may be used in which the minimum elements of output vector Z (P$_i$) 35 corresponds to the management zone selected.

Figure 5:
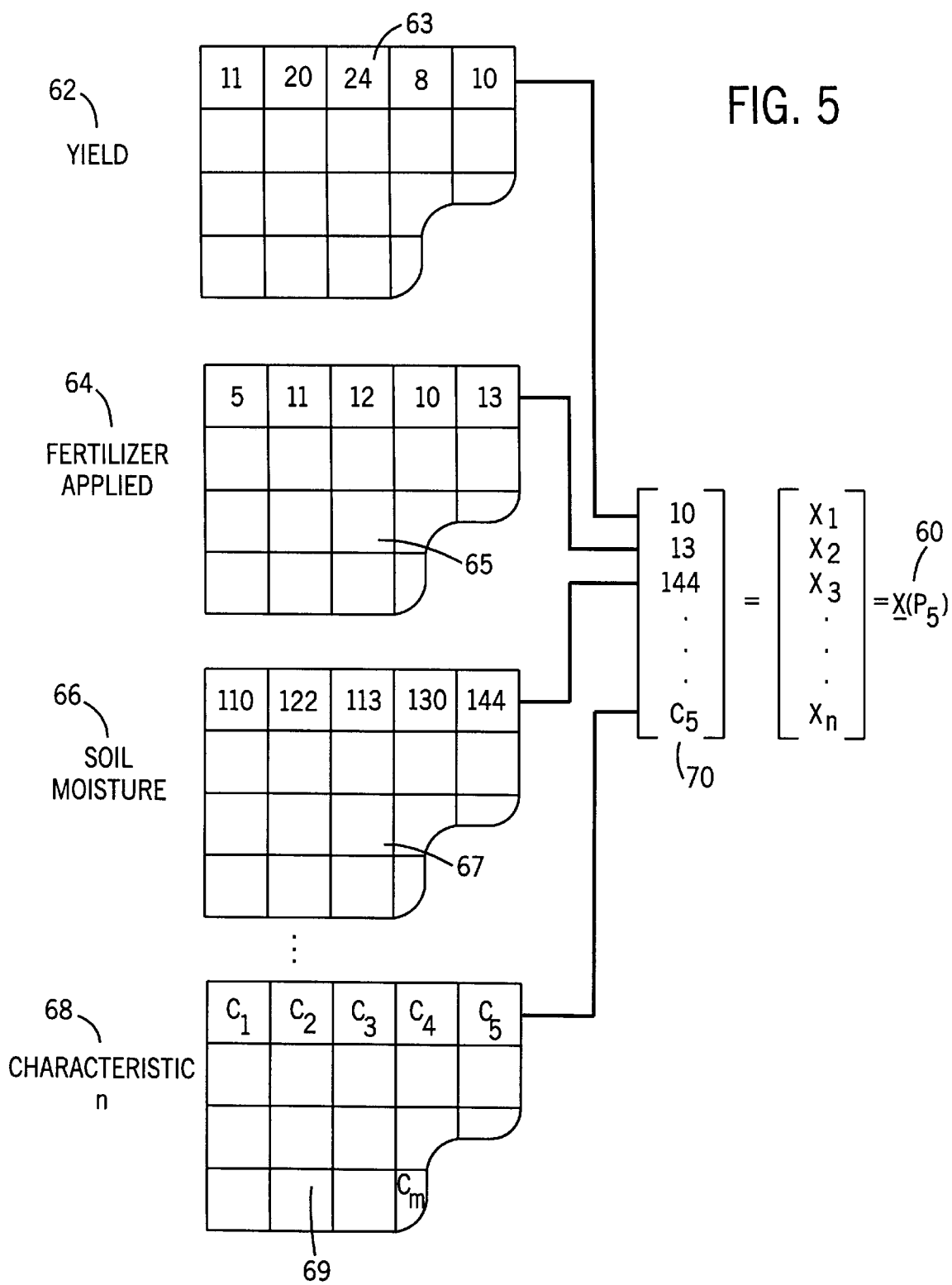
FIG. 5 is a schematic representation of an input vector provided to the Kohonen neural network which is derived from site-specific farming data.

Kohonen neural network 30 performs the aforementioned calculations at each position P$_i$ corresponding to a position in the farm field. For example, FIG. 5 depicts schematically how an input vector X (P$_5$) includes n site-specific field characteristics including yield 62, fertilizer applied 64, soil moisture 66, and characteristic n 68. The characteristics are organized in memory as layers of site-specific data, each layer corresponding to a single site-specific characteristic. FIG. 5 depicts farm field maps divided into a multiplicity of discrete positions. Field characteristics are determined at each of the positions and a sampling of those field characteristics are provided on the maps. For example, a yield map 63 shows a yield value of "11" at position 1, a fertilizer applied map 65 shows a fertilizer applied value of "12" at position 3, a soil moisture map 67 shows a soil moisture value of "122" at position 2, and a characteristic n map 69 shows a characteristic n value of "C$_5$" at position 5. FIG. 5 further depicts how input vector X (P$_5$) 60, and generally how input vectors are assembled, for a particular position in the field. Here, for field position "5", a vector X (P$_5$) is assembled by placing the n site-specific values at position 5 as elements in a vector 70 (i.e., 10, 13, 144, . . . , C$_5$). Maps 63, 65, 67, and 69 can be organized using either grids or polygons.

Figure 6:
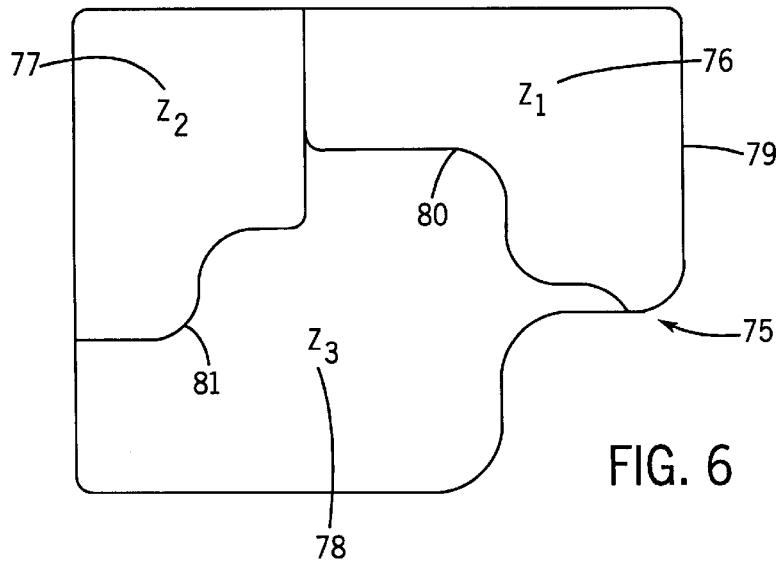
FIG. 6 is a schematic representation of a management zone map derived from the output of the Kohonen neural network.

The m field positions shown in FIG. 5 are classified by Kohonen neural network 30 into l management zones, where l is less than m. In FIG. 6, l =3 and a field map 75 shows a field subdivided into three management zones including a first management zone Z$_i$ 76, a second management zone Z$_2$ 77, and a third management zone Z$_3$ 78. The field boundaries are represented by a field boundary line 79 and the zones are defined by zone boundary lines 80 and 81.

As shown in FIG. 1, post-processor 34 interprets and organizes the outputs of Kohonen neural network 30 such that the outputs may be displayed on a management zone map 40 similar to exemplary field map 75. In one embodiment, post-processor 34 includes the function of correlating the outputs of Kohonen neural network 30 with field positions. Post-processor 34 may also smooth the outputs to avoid sharp discontinuities between different management zones within a field. For example, a filtering or averaging function may be used to smooth the output data.

Post-processor 34 further communicates interpreted and organized data or raw data from Kohonen neural network 30 to second information database 38. Second information database 38 retains the data for alternative uses such as, for example, preparing prescription maps, or for later retrieval.

Kohonen neural network 30 is one of the class of self-organizing networks that learn appropriate classifications based upon the input data. In an alternative embodiment, Kohonen neural network 30 may be replaced by one of a number of self organizing maps and classifying networks including, but not limited to, adaptive resonance theory (ART) networks, adaptive Kohonen (AK) networks, radial basis function networks, and hybrids of these networks. Further, Kohonen neural network 30 may be replaced by an alternative algorithm adapted to learn appropriate management zone classifications based upon the input data.

In a preferred embodiment using a Kohonen neural network, an appropriate input/output relationship is learned by the network through a process of training, during which inputs are presented to the network and the weights 37 are adjusted according to a learning law. Training is accomplished using an exemplary set of input data. After training has been completed, site-specific farming inputs may be presented to network 30 for classification into management zones.

In a Kohonen neural network, the weights contain the so-called knowledge of the network. In other words, the weights are variable during a training process so that an appropriate input/output mapping is developed or learned during the training process. The weights of the network are adjusted iteratively until an appropriate mapping is stored by the values of the network weights. To carry out the training process, an input is presented to the network having the weights of the network initialized at a random set of values. The output of each node is calculated using the formula previously provided. The l outputs are compared and the largest output is declared the winner. The output Z$_i$, the ith node being the winner, is set to 1 and the other outputs being set to zero value. The weights are then updated according to the Kohonen learning law:

$$W_{ij}^{new} = W_{ij}^{old} + \alpha(X_j - W_{ij}^{old})Z_i$$
$$i = 1, \ldots, l; j = 1, \ldots, n.$$

In this equation, α represents the learning rate and may be set at any value between 0 and 1 (i.e., 0<α<1) which provides the desired training algorithm performance.

Alternative to the output equation previously presented, vector Z may be calculated using a variety of distance metrics including, but not limited to, the Euclidean distance metric. When a distance metric, such as Euclidean distance is used, the winning node is the node having the minimum output value, $Z_i$. Also, alternative to the learning law presented above, other variations of the learning law may be used including, but not limited to, an adaptive learning law having an adaptive training rate, in other words α changes as a function of the number of iterations, typically α is lowered as the number of iterations increases.

In one embodiment, a farm field may be classified into a plurality of management zones. The field is preferably divided up into a multiplicity of discrete positions, each position being representative of a discrete area adjacent the position. Site-specific data is then recorded by use of a sensing device and a georeferenced digital map of the field. As depicted in FIG. 1, the data is preferably stored in an information database such as database 20. This data is provided to preprocessor 24 where the input vector undergoes a normalization transformation. The normalized input vector is communicated to Kohonen neural network 30, which provides an output vector to post processor 34. Post processor 34 interprets the Kohonen output, and correlates the output with a field position, and with a management zone. Post processor 34 further prepares a signal to be provided to display 40. Display 40 may be a CRT display, LCD display, printer, plotter, or other suitable device for providing a management zone map. Post-processor 34 also prepares a signal which causes the management zone data to be stored in database 38.

Figure 2:
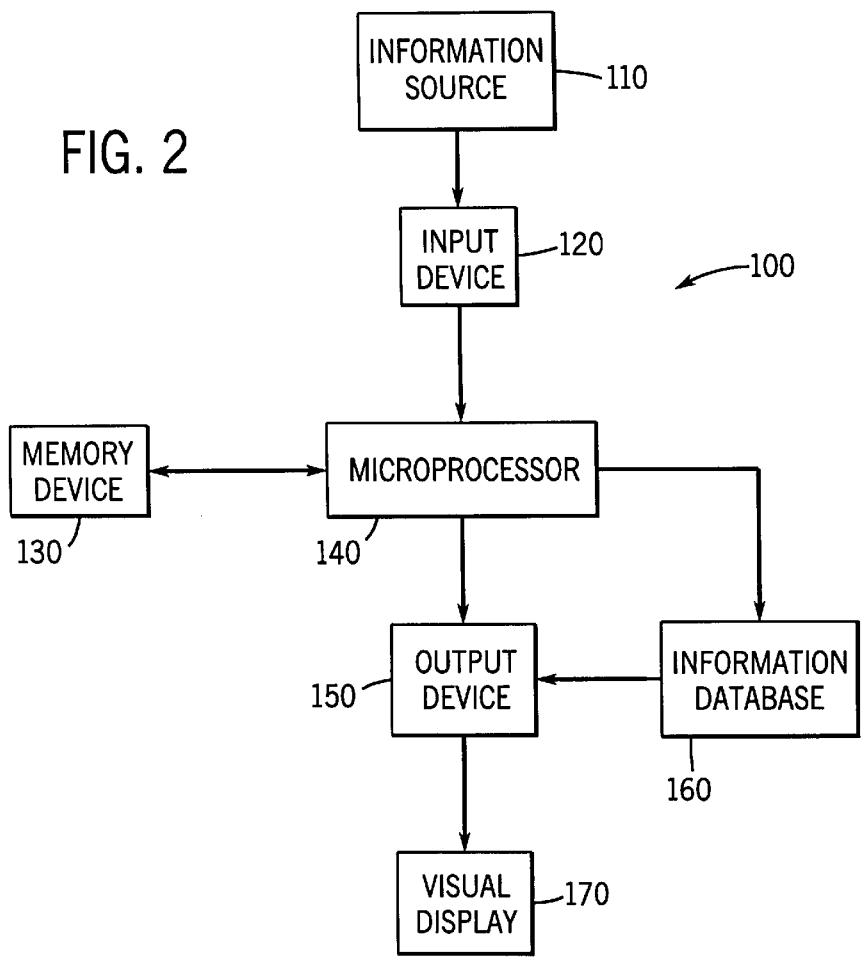
FIG. 2 is a block diagram of a microprocessor based system for classifying site-specific farming data into management zones.

As depicted in FIG. 2, in one embodiment of the present invention, Kohonen neural network 30 is implemented using a software program embedded into a computing device. Computing apparatus 100 includes an information source 110, an input device 120, a memory device 130, a microprocessor 140, an output device 150, an information database 160, and a visual display 170.

Information source 110 may be a group of sensors, a human, an information database, or other suitable information source adapted to provide site-specific farming data to input device 120. Input device 120 may be a keyboard, an RS-232 interface, SCSI interface, PCI interface, an Analog to Digital converter or another device for providing input data to microprocessor 140. A computer memory card (e.g., a PCMCIA card) may also be used to provide the site-specific farming data. A memory device 130 stores a program for preprocessing the input data. Memory device 130 also holds a program for Kohonen neural network 30. The programs, stored in memory device 130, are carried out by microprocessor 140. The results of the neural network processing are communicated to an information database 160 and to output device 150. Output device 150 may be a parallel interface, a video interface or other suitable device. In a preferred embodiment, output device 150 communicates resultant management zone information to visual display 170. Visual display 170 preferably displays a map showing the management zone boundaries, such as the map as depicted in FIG. 6.

Although only a few exemplary embodiments of this invention have been described above, those skilled in the art will readily appreciate that many modifications are possible in the exemplary embodiments without materially departing from the novel teachings and advantages of this invention. As is readily indicated, the invention can be employed in a variety of ways and using a variety of neural network architectures. Further, the type of information processor mechanisms used may be varied in so far as they continue to accomplish functions related to classifying site-specific farming data into discrete management zones. Accordingly, all such modifications are intended to be included within the scope of the invention as defined in the following claims.

Other substitutions, modifications, changes, and omissions may be made in the design, operating conditions, and arrangement of preferred and alternative embodiments without departing from the spirit of the invention as expressed in the appended claims.

What is claimed is:

1. A method of determining management zones in a field for precision farming, the method comprising the steps of:
   obtaining site-specific farming data;
   providing the site-specific farming data to a self-organizing network, the self-organizing network configured to classify locations in the field into management zones based upon the site-specific farming data;
   obtaining classification outputs from the self-organizing network; and
   correlating the classification outputs of the self-organizing network with positions in the field.

2. The method of claim 1, further comprising the step of displaying a map of the field showing the management zones throughout the field.

3. The method of claim 1, further comprising the step of receiving field location data from a georeferenced digital map of the field.

4. The method of claim 1, further comprising the step of training the self-organizing network to make adjustments to the self-organizing network so that the classification characteristics of the self-organizing network for classifying the site-specific farming data improve.

5. The method of claim 4, wherein the step of obtaining classification outputs includes post processing data output from the self-organizing network.

6. The method of claim 4, further comprising the step of choosing a training rate value.

7. The method of claim 6, wherein the training rate value is variable during training.

8. The method of claim 4, wherein the site-specific farming data includes a plurality of data layers and the method further comprises the step of determining which layers of site-specific farming data to provide to the self-organizing network to generate the management zones.

9. The method of claim 8, further comprising the step of dividing the field into a multiplicity of discrete areas.

10. The method of claim 4, further comprising the step of preprocessing the site-specific farming data.

11. The method of claim 10, wherein the preprocessing step includes the step of normalizing the site-specific farming data being provided to the self-organizing network.

12. The method of claim 1, wherein the self-organizing network is selected from a group consisting of a Kohonen Network, an Adaptive Resonance Theory (ART) network, a radial basis function network, an Adaptive Kohonen Network (AK), and a hybrid comprised of a Kohonen Network and a network selected from a group consisting of an ART and an AK.

13. The method of claim 1, wherein the self-organizing network is a Kohonen neural network.

14. The method of claim 13, further comprising the step of choosing a distance metric to be used by the Kohonen neural network.

15. The method of claim 14, wherein the distance metric used is a Euclidean distance metric.

16. The method of claim 14, further comprising the step of displaying the management zones on a cathode ray tube map display.

17. An apparatus for determining at least two management zones in a field, based upon field characteristics at a multiplicity of field positions, the apparatus comprising:

an information input device for receiving site-specific field characteristic data;

a self-organizing network coupled to the information input device, wherein the self-organizing network classifies each of the field positions into one of the at least two management zones; and an information output device coupled to the self-organizing network, wherein the information output device communicates the management zone classifications.

18. The apparatus of claim 17, further comprising a postprocessor coupled to the information output device, wherein the post processor manipulates the management zone classifications.

19. The apparatus of claim 18, wherein the postprocessor correlates the management zone classifications with the field positions.

20. The apparatus of claim 17, further comprising a preprocessor coupled to the information input device, wherein the preprocessor manipulates the field characteristic data for utilization by the self-organizing network.

21. The apparatus of claim 20, wherein the preprocessor normalizes the field characteristic data.

22. The apparatus of claim 17, further comprising an information database coupled to the information input device, wherein the information database stores the field characteristic data.

23. The apparatus of claim 17, wherein the self-organizing network is a Kohonen neural network.

24. The apparatus of claim 17, wherein the self-organizing network is selected from a group consisting of a Kohonen Network, an Adaptive Resonance Theory (ART) network, a radial basis function network, an Adaptive Kohonen Network (AK), and a hybrid comprised of a Kohonen Network and a network selected from a group consisting of an ART and an AK.

25. The apparatus of claim 17, further comprising an information database coupled to the information output device, wherein the information database stores the management zone classifications.

26. The apparatus of claim 25, further comprising a management zone display, wherein the management zone display shows the management zone classifications in a user-readable format.

27. The apparatus of claim 17, wherein the self-organizing network has a multiplicity of weighted interconnections and has a multiplicity of nodes, each node having a transfer function designed to provide desired management zone data.

28. A computing apparatus for determining at least two management zones in a field, based upon field characteristics at a multiplicity of field positions, the apparatus comprising:

an input device;

a microprocessor coupled to the input device;

an output device coupled to the microprocessor; and a memory device coupled to the microprocessor, wherein the memory device stores a Kohonen neural network program, the program being read and executed by the microprocessor to implement a Kohonen neural network, the Kohonen neural network receiving field characteristic data from the input device, and communicating management zone data to the output device.

29. The computing apparatus of claim 28, wherein the input device receives the field characteristic data, the field characteristic data being communicated to the microprocessor.

30. The computing apparatus of claim 28, wherein the output device receives management zone data from the microprocessor and communicates the management zone data to a user.

31. The computing apparatus of claim 28, wherein the memory device also stores a preprocessing algorithm that conditions the field characteristic data to be communicated to the Kohonen neural network.

32. The computing apparatus of claim 28, wherein the memory device also stores a post processing algorithm that conditions the management zone data to be communicated to a user.

33. The computing apparatus of claim 28, wherein the output device is a visual display, the visual display showing a map of the field and the management zones within the field.

34. The computing apparatus of claim 28, wherein the memory device stores a training program, the training program being configured to make adjustments to the Kohonen neural network program, so that the Kohonen neural network is trained to properly classify field characteristic data into management zone data.

* * * * *